(12) United States Patent
Kinoshita et al.

(10) Patent No.: US 10,139,719 B2
(45) Date of Patent: Nov. 27, 2018

(54) AERIAL IMAGE DISPLAY DEVICE

(71) Applicant: KONICA MINOLTA, INC., Chiyoda-ku, Tokyo (JP)

(72) Inventors: Masaya Kinoshita, Nara (JP); Hirohisa Kitano, Osaka (JP); Makoto Jin, Sakai (JP); Shuji Ikenaga, Kashiba (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/735,373

(22) PCT Filed: May 13, 2016

(86) PCT No.: PCT/JP2016/064265
§ 371 (c)(1),
(2) Date: Dec. 11, 2017

(87) PCT Pub. No.: WO2016/199540
PCT Pub. Date: Dec. 15, 2016

(65) Prior Publication Data
US 2018/0164671 A1 Jun. 14, 2018

(30) Foreign Application Priority Data
Jun. 11, 2015 (JP) .................................. 2015-118499

(51) Int. Cl.
*G03B 21/28* (2006.01)
*G02B 5/02* (2006.01)
(Continued)

(52) U.S. Cl.
CPC ............... *G03B 21/28* (2013.01); *G02B 5/02* (2013.01); *G02B 5/08* (2013.01); *G02B 27/22* (2013.01); *G03B 21/14* (2013.01); *G03B 21/60* (2013.01)

(58) Field of Classification Search
CPC ...... G03B 21/28; G03B 21/208; G03B 21/62; G03B 21/145; G03B 21/625; G02B 27/10;
(Continued)

(56) References Cited

U.S. PATENT DOCUMENTS

2010/0110384 A1* 5/2010 Maekawa ............... G02B 5/124
353/10
2011/0285965 A1* 11/2011 Sugiyama ............... G03B 21/28
353/10
(Continued)

FOREIGN PATENT DOCUMENTS

JP 2010262229 A 11/2010
JP 5667729 B2 2/2015

OTHER PUBLICATIONS

International Search Report for corresponding Application No. PCT/JP2016/064265; dated Jul. 26, 2016.

*Primary Examiner* — Sultan Chowdhury
(74) *Attorney, Agent, or Firm* — Cantor Colburn LLP

(57) ABSTRACT

This aerial image display device is provided with an optical plate having a plurality of reflective surfaces orthogonal to each other in plan view, a projection device, a specular mirror, and a screen. The mirror includes a counter mirror disposed spaced apart from the optical plate at the opposite side of a focused image M across the optical plate. The projection device and the screen sandwich a light path between the counter mirror and the optical plate at the opposite side of the focused image (M) across the optical plate. The projection light emitted from the projection device is incident on the screen after reflecting from the counter mirror, and then incident on the optical plate after reflecting from the screen and then from the same counter mirror.

10 Claims, 9 Drawing Sheets

(51) Int. Cl.
*G02B 5/08* (2006.01)
*G02B 27/22* (2018.01)
*G03B 21/14* (2006.01)
*G03B 21/60* (2014.01)

(58) Field of Classification Search
CPC .......................... G02B 27/022; G02B 27/145;
G02B 27/0172; G02B 27/02292
See application file for complete search history.

(56) References Cited

U.S. PATENT DOCUMENTS

2014/0253880 A1* 9/2014 Yoneno .................. G03B 21/28
353/10
2015/0370080 A1* 12/2015 Meacham .............. G03B 21/60
353/7

* cited by examiner

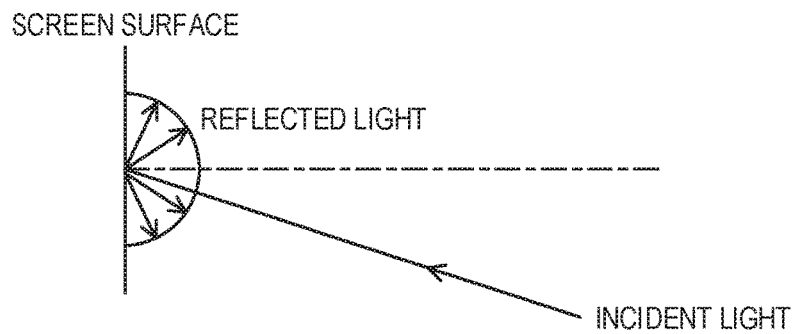
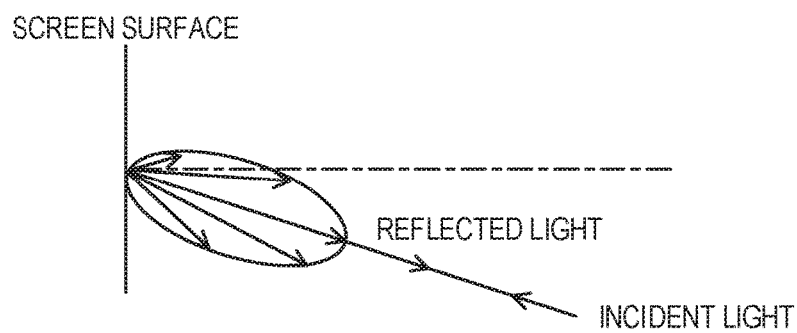
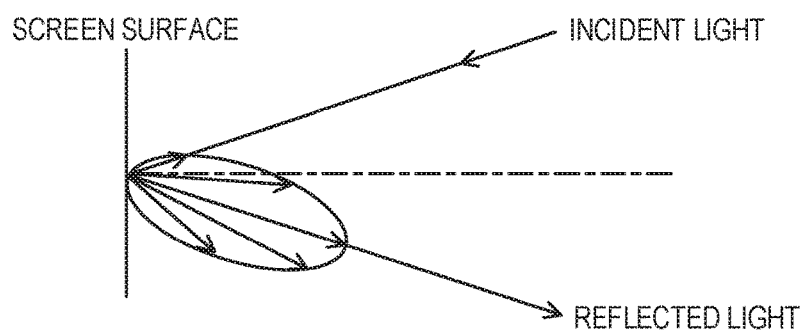

AERIAL IMAGE DISPLAY DEVICE

CROSS REFERENCE TO RELATED APPLICATIONS

This is the U.S. national stage of application No. PCT/JP2016/064265, filed May 13, 2016. Priority under 35 U.S.C. § 119(a) and 35 U.S.C. § 365(b) is claimed from Japanese Application No. 2015-118499, filed Jun. 11, 2015, the disclosures of which are also incorporated herein by reference.

TECHNICAL FIELD

The present invention relates to an aerial image display device which displays an image in the air.

BACKGROUND ART

A conventional example of a display device that allows a viewer to see a real image of an object to be viewed formed in the air by using an optical plate is disclosed in, for example, Patent Document 1 listed below. This display device forms a real image of an object to be viewed in the air by having light from the object to be viewed reflected by an optical plate (dihedral corner reflector array) and directing the reflected light into the air on a side opposite to the side where the object to be viewed is located.

Normally, a midair image is formed at a position planar symmetric to an object to be viewed with respect to an optical plate. Hence, in a case of forming an image at a position far away from the optical plate in order to provide an image easy for a viewer to see, the object to be viewed needs to be placed far away from the optical plate, as a result of which the space on the object-to-be-viewed side of the optical plate becomes large. This problem is dealt with in Patent Document 1 by providing at least one reflective mirror in an optical path between an object to be viewed and an optical plate to thereby bent the optical path to reduce the space on the object-to-be-viewed side of the optical plate, and thereby a compact display device is achieved.

In Patent Document 2, for example, an optical image formation device is disclosed which has a light-controlling panel, a display unit, and a mirror member (first mirror member). The light-controlling panel is composed of first and second light-controlling members, which each have a plurality of band-shaped reflective parts disposed parallel to each another, and which are disposed facing each other such that the respective band-shaped reflective parts cross each other. The display unit is disposed at a position equal in height to the position of the light-controlling panel, and is constituted by a liquid crystal display, for example, and the display unit may be either a flat or three-dimensional object. The mirror member is disposed parallel to the light-controlling panel with a space there between.

Image light from the display unit is reflected by the mirror member to be then incident on the light-controlling panel, where the image light is reflected by the first and second light-controlling members and is directed into the air on a side opposite to the light entrance side (the side where the mirror member is disposed). Thereby, a real image of the image displayed on the display unit is formed in the air. By using the mirror member to bend the optical path of the image light traveling from the display unit to the light-controlling panel, the space on the light entrance side with respect to the light-controlling panel is reduced, and thereby the device is made compact and thin.

CITATION LIST

Patent Documents

Patent Document 1: Japanese Patent Application Publication No. 2010-262229 (claims 1, 9, paragraph [0027], FIG. 1, FIG. 2, etc.)
Patent Document 2: Japanese Patent Publication No. 5667729 (claim 1, paragraphs [0013], [0016]-[0021], FIG. 1, FIG. 2, etc.)

SUMMARY OF INVENTION

Technical Problem

However, the configurations disclosed in Patent Documents 1 and 2, which simply form a real image of an object (an object to be viewed, such as an image displayed on a display unit) in the air, allow only a low degree of freedom of image expression. For example, if not only a flat image but also an image including recesses and projections or steps could be formed in the air, it would increase the degree of freedom of image expression, but in Patent Documents 1 and 2, no study is made of a configuration for increasing the degree of freedom of image expression.

With the configuration disclosed in Patent Document 2, which forms in the air a real image of an image displayed on a liquid crystal display, the liquid crystal display needs to have a high-power light source to allow a bright, highly brilliant real image (aerial image) to be formed. Increase in power of the light source invites increase in dimensions of the light source, which leads to increase in dimensions (in particular, thickness) of the liquid crystal display, and thus can invite increase in thickness of the whole device.

Furthermore, in Patent Document 2, no study is made of increasing the proportion of light that is emitted from the liquid crystal display which contributes to the formation of an aerial image (light utilizing efficiency) while simultaneously reducing distortion in the aerial image. Hence, it is impossible to provide an aerial image in which satisfactory brightness and reduction of distortion are both achieved.

The present invention has been made to solve the above-described problems, and an object of the present invention is to provide an aerial image display device that has a thin configuration and is capable of providing an aerial image that is bright and less in distortion, and also allows increased degree of freedom of image expression.

Solution to Problem

An aerial image display device according to one aspect of the present invention includes an optical plate having a plurality of reflective surfaces orthogonal to each other in plain view, and, by directing light to be incident on the optical plate and having the light reflected by the plurality of reflective surfaces to collect the light in air on a side which is opposite to a light-incident side with respect to the optical plate, the aerial image display device forms an image in the air. The aerial image display device further includes a projection device which emits projection light representing the image, a screen which is irradiated with the projection light, and a mirror which reflects incident light. Here, the mirror includes a counter mirror disposed on a side opposite to an image-forming side where the image is formed, with respect to the optical plate, with a space between the counter mirror and the optical plate, the projection device and the screen are disposed on the side opposite to the image-forming side with respect to the optical plate so as to sandwich there between an optical path between the counter mirror and the optical plate, and the projection light emitted from the projection device is incident on the screen after being reflected by the counter mirror, and is then incident on the optical plate after being reflected by the screen and then by the same counter mirror.

Advantageous Effects of Invention

According to the above-described configuration, it is possible, with a thin configuration, not only to provide an aerial image that is bright and less in distortion, but also to increase the degree of freedom of image expression.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention:

FIG. 2A is an explanatory diagram showing reflection characteristics of a diffuse-reflective screen applicable to the aerial image display device;

FIG. 2B is an explanatory diagram showing reflection characteristics of a retro-reflective screen applicable to the aerial image display device;

FIG. 2C is an explanatory diagram showing reflection characteristics of a specular-reflective screen applicable to the aerial image display device;

DESCRIPTION OF EMBODIMENTS

An embodiment of the present invention will be described below with reference to the accompanying drawings. In this description, when a numerical value range is indicated as a-b, the lower limit a and the upper limit b are both included in the numerical value range. It should be understood that the present invention is not limited to what is specifically described below.

(Overall Configuration of Aerial Image Display Device)

Figure 1:
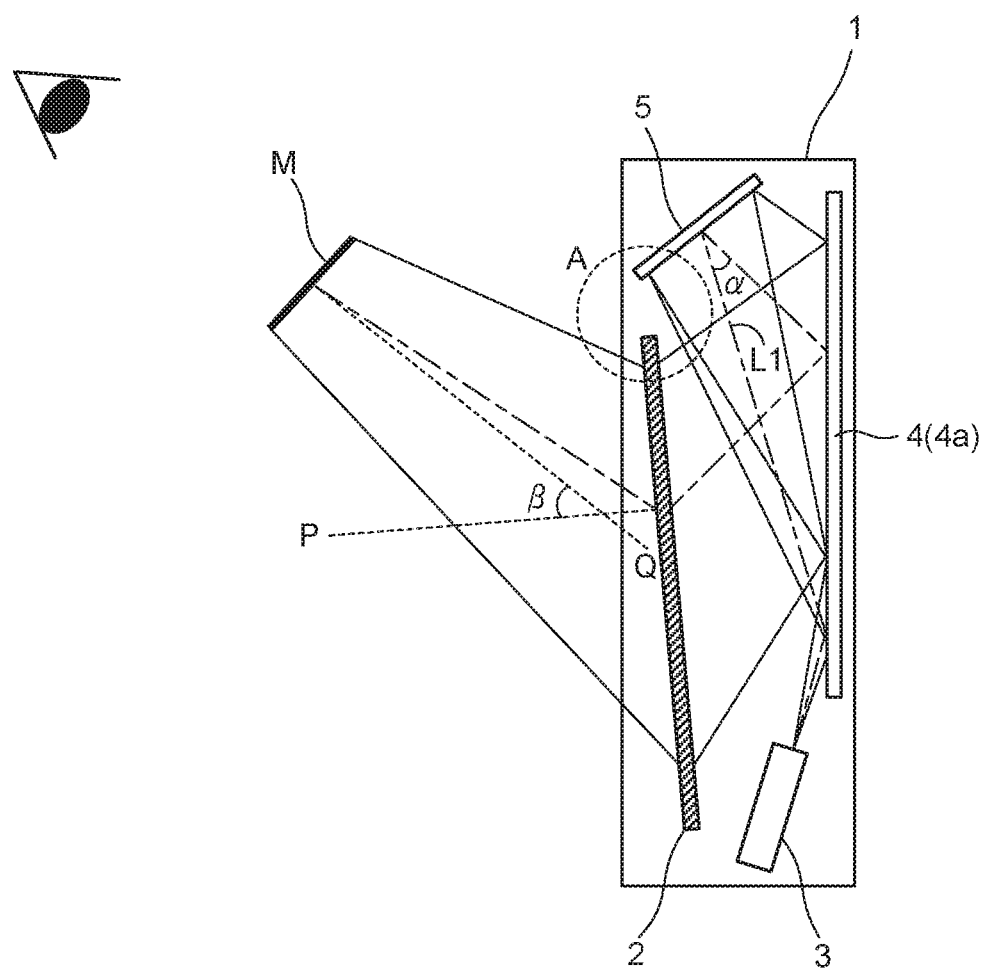
FIG. 1 is an explanatory diagram schematically showing an overall configuration of an aerial image display device according to an embodiment of the present invention.
Figure 3A:
FIG. 3A is an explanatory diagram showing an example of a surface shape of a screen of the aerial image display device.
Figure 3B:
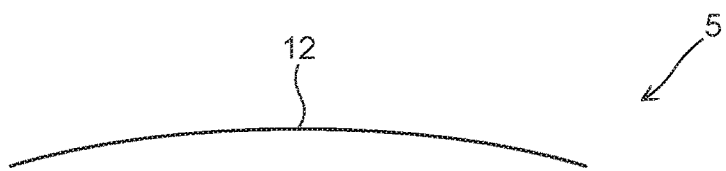
FIG. 3B is an explanatory diagram showing another example of the surface shape of the screen.
Figure 3C:
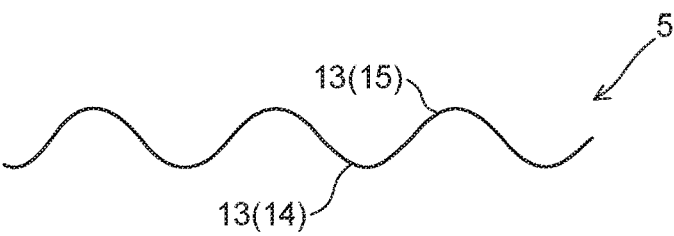
FIG. 3C is an explanatory diagram showing still another example of the surface shape of the screen.
Figure 3D:
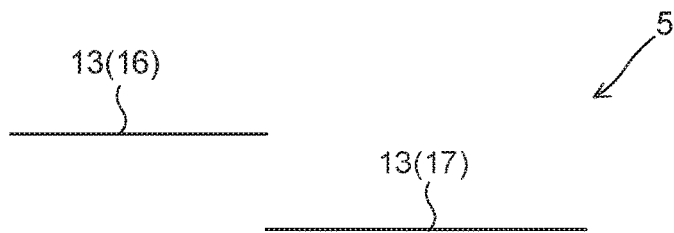
FIG. 3D is an explanatory diagram showing still another example of the surface shape of the screen.

FIG. 1 is an explanatory diagram schematically showing an overall configuration of an aerial image display device 1 according to the present embodiment. The aerial image display device 1 displays an image M in the air as a real image, and includes an optical plate 2, a projection device 3, a mirror 4, and a screen 5.

The optical plate 2 forms the image M in the air by reflecting incident light rays inside it to collect them in the air on a side opposite to a light incident side with respect to the optical plate 2. Usable as the optical plate 2 is, for example, a plate member of a single-layer configuration having pairs of reflective surfaces such that one and the other reflective surfaces in each pair are orthogonal to each other in plan view (each pair forming an L-shape in plan view) are arranged in an array form, or a plate member of a two-layer configuration in which two layers, each having a plurality of reflective surfaces arranged parallel to each other, are put one over the other in such a manner that the reflective surfaces in one layer are orthogonal to those in the other layer in plan view. Details of the configuration of the optical plate 2 will be described later. The projection device 3 is a device (projector) that emits projection light representing the image M.

The mirror 4 is composed of at least one mirror which reflects incident light. The mirror 4 includes a counter mirror 4a. The counter mirror 4a is disposed on a side opposite to an image-M forming side with respect to the optical plate 2 and faces the optical plate 2 with a space there between. Although the counter mirror 4a may be arranged in parallel with the optical plate 2, it is arranged in the present embodiment in such a manner that the space between the counter mirror 4a and the optical plate 2 is wider on a screen-5 side than on a projection device-3 side.

The screen 5 is a reflective screen, onto which an image is projected by irradiating the screen 5 with projection light from the projection device 3, and which also reflects the projection light with which it is irradiated. FIG. 2A-FIG. 2C show variations of the reflective screen, showing reflection characteristics of the various reflective screens. There are different types of reflective screens, namely, a diffuse-reflective screen, which reflects incident light in all directions, a retro-reflective screen, which reflects incident light mainly in a direction reverse to an incidence direction, and a specular-reflective screen, which performs substantially specular reflection of incident light. In the present embodiment, although any of the three types of reflective screens can be used as the screen 5, in particular, a specular-reflective screen is used, which has high directivity in a specular reflection direction with respect to the projection light. The half-value angle of the specular-reflective screen is set to 20-40°. The half-power angle is an angle at which the gain of the screen (ratio of brightness of reflected light with respect to projection light) is half of the peak gain of the screen. Examples of the specular-reflective screen include a pearl screen, a silver screen, and so on.

FIG. 3A-FIG. 3D schematically show examples of the shape of the surface of the screen 5. In the screen 5, the surface to be irradiated with projection light (which may hereinafter be referred to as projection surface) may be a flat surface 11 (see FIG. 3A), a curved surface 12 constituted by a single concave or convex surface (see FIG. 3B), or an uneven surface 13 having recesses and projections formed thereon (see FIG. 3C, FIG. 3D). Further, the uneven surface 13 may be formed by continuously connecting recessed parts 14 with projecting parts 15 (see FIG. 3C), or may be formed of discontinuous steps made with a plurality of surfaces (for example, surfaces 16, 17) (see FIG. 3D). The steps are formed to be discontinuous with (separate from) each other by displacing the plurality of surfaces 16,17 aligned side by side on the same plane from each other in a direction perpendicular to these surfaces. It can also be said that the discontinuous steps are formed by displacing the two surfaces 16, 17 facing each other with a space there between from each other in a direction perpendicular to the direction in which they face each other. Here, three or more surfaces may be discontinuously arranged to form steps. Or, the surfaces 16, 17 may be connected with each other to form the uneven surface 13 made of recesses and projections continuously connected with each other.

That is, it can be said that the uneven surface 13 may include the recessed parts 14 and the projecting parts 15 which are continuously connected with each other. It can also be said that the uneven surface 13 may include a plurality of surfaces (for example, the surfaces 16, 17) which have been brought into positions separate from each other by being displaced from each other in a direction perpendicular thereto from side-by-side aligned positions on the same plane.

As shown in FIG. 1, the projection device 3 and the screen 5 described above are disposed on a side opposite to the image-M forming side with respect to the optical plate 2 so as to sandwich there between an optical path between the counter mirror 4a and the optical plate 2.

In the above-mentioned configuration, projection light rays emitted from the projection device 3 are reflected by the counter mirror 4a and then is incident on the screen 5, and after being reflected by the screen, the projection light rays are reflected by the same counter mirror 4a to be incident on the optical plate 2. The incident projection light rays are reflected inside the optical plate 2, to converge in the air on a side opposite to the light incident side with respect to the optical plate 2, and thereby the image M is formed. Thus, a viewer can see the image M formed in the air. Note that the image M formed in the air is a real image of the image projected on the screen 5.

With the configuration shown in FIG. 1, the image M (two-dimensional image) formed in the air has dimensions of 120 mm (H)×190 mm (W). Here, the parameters of the device at this time are as follows:

An effective area of the optical plate 2 (area in which incident light is reflected to the image formation side) is 350 mm×350 mm.

A distance from the optical plate 2 to the image M on an optical path of a central light ray L1 (light ray indicated by a dashed-dotted line in FIG. 1) of a light beam of the projection light is 300 mm.

A distance from a center of the image M to an eye point of the viewer is 500 mm.

The projection device is 400-PRJ014BK produced by SANWA SUPPLY INC.

Here, in a case where the device is disposed to stand in a vertical direction (up-down direction) as in FIG. 1, based on the theory of forming the image M in the air, it is assumed that, the reflective surfaces of the optical plate 2 that are orthogonal to each other (surfaces on which later-described reflective films 21b, 31b (see FIG. 7, FIG. 8) are formed) are each arranged at an angle of 45° (if one is at an angle of 45° then the other is at an angle of −45°) with respect to the vertical direction (strictly, a direction of a component, in the vertical direction, along a surface of the optical plate 2). For example, the optical plate 2 is disposed such that, in an XY plane of FIG. 6, a direction at an angle of 45° with respect to both an X axis and a Y axis is the vertical direction. As for the theory of forming the image M, a description thereof will be given later.

As has been discussed above, according to the present embodiment, an image is projected onto the screen 5 by means of the projection device 3, and a real image (image M) of the projected image is formed in the air by means of the optical plate 2. Thus, by using the projection device 3 and the screen 5, with the projection device 3 disposed on the side opposite to the screen 5 with respect to the optical path between the counter mirror 4a and the optical plate 2, it is possible to make the aerial image display device 1 compact as a whole. Besides, since the optical path of the incident light (projection light) is bent by means of a mirror (the counter mirror 4a), it is also possible to reduce the thickness of the aerial image display device 1 (its width in a direction in which the counter mirror 4a and the optical plate 2 are opposed to each other). Furthermore, since the projection light is directed onto the screen 5 and into the optical plate 2 by means of a common (single) counter mirror 4a, it is possible to achieve a thin configuration at low cost.

Moreover, with the configuration in which the projection device 3 is disposed on the side opposite to the screen 5 with respect to the optical path between the counter mirror 4a and the optical plate 2, even if a larger projection device is used as the projection device 3, it will not hinder the thinning of the device as a whole, as long as the space between the counter mirror 4a and the optical plate 2 is within the range that allows the thinning. Thus, it is possible to widen an allowable range of the dimensions of the projection device 3, and hence, a large projection device having a high-power light source within a range that does not hamper the thinning of the device can be used as the projection device 3. As a result, it becomes possible to provide the viewer with the image M that is bright (highly brilliant) with a thin configuration of the device.

The projection light emitted from the projection device 3 is reflected by the counter mirror 4a to be incident on the screen 5, and then, after being reflected by the screen 5, the projection light is reflected by the same counter mirror 4a to be incident on the optical plate 2. In this manner, the reflection light from the screen 5 is separated from the optical path of the light incident thereon and directed to the optical plate 2, and thus, even with the configuration where an image is projected onto the screen 5, it is possible to form a real image of the projected image in the air by means of the optical plate 2.

Moreover, with the configuration where the projection light is directed from the counter mirror 4a to be incident on the screen 5, and the projection light reflected from the screen 5 is directed to be incident on the same counter mirror 4a, it is possible to make the projection light incident on the screen 5 from a direction close to perpendicular thereto and also to make the reflection light leave the screen 5 in a direction close to perpendicular thereto. This makes it possible for the projection light incident on the screen 5 to be efficiently reflected by the screen 5 to be efficiently directed via the counter mirror 4a to be incident on the optical plate 2, and thus, it is possible to increase the proportion of light rays in the projection light that contribute to the formation of the image M (light use efficiency). Further, since the projection light is directed from the screen 5 in a direction close to perpendicular thereto, it is possible to obtain an image with less distortion as the image M formed in the air via the counter mirror 4a and the optical plate 2. That is, by setting the optical path of the projection light as described above, it is possible to form the image M in the air to be bright (with high brilliance) and with less distortion.

Further, with the configuration where the projection device 3 and the screen 5 are used to form the image M in the air, a screen having any of shapes shown in FIG. 3A-FIG. 3D can be selected as the screen 5. In this case, an image formation plane of the image M formed in the air also has a shape in accordance with the shape of the screen 5. For example, in a case where the projection surface of the screen 5 is the flat surface 11, the curved surface 12, or the uneven surface 13, the image formation plane of the image M formed in the air accordingly is a flat plane, a curved plane, or an uneven plane (including a shape formed of continuous recesses and projections and a surface formed of discontinuous steps). Accordingly, as the image M formed on the image formation plane, not only a flat image but also an image having a curved plane, recesses and projections, or steps can be formed, and this helps increase the degree of freedom of image expression.

Further, with the configuration where the projection device 3 and the screen 5 are used to form the image M in the air, by adjusting relative positional relationships and angles between the optical plate 2, the counter mirror 4a, and the screen 5, it is possible to freely adjust an angle (tilt angle) of the image M with respect to the horizontal plane, and the formation position of the image M. Thus, the image M can be easily formed at a position where the viewer can easily view the image M. In particular, the tilt angle of the image M can be set more freely, and the image M can be provided as an image that is floating above the viewer's eye level and that is easy for the viewer to see.

In area A in FIG. 1, the optical plate 2 and the screen 5 are close to each other, and thus are apt to interfere with each other, and the projection light reflected from the counter mirror 4a to be incident on the screen 5 travels close to an end portion of the optical plate 2 and thus interference is apt to occur between them. However, as in the present embodiment, by disposing the counter mirror 4a in such a manner that the space between the counter mirror 4a and the optical plate 2 is wider on the screen 5 side than on the projection device 3 side, it is possible to reduce the space between the optical plate 2 and the counter mirror 4a to achieve a thin device, meanwhile avoiding the interference between the optical members and the interference between the optical member and light beams.

Although, as described above, the screen 5 may be any of a diffuse-reflective screen, a retro-reflective screen, and a specular-reflective screen, by using a specular-reflective screen as the screen 5, it is possible to substantially specular reflect the projection light incident on the screen 5 to efficiently direct the projection light to be incident on the optical plate 2. In particular, with the half-value angle of the specular-reflective screen set to 40° or less, it is possible to increase the proportion of light rays of the projection light incident on and reflected by the screen 5 that travel via the counter mirror 4a to the optical plate 2. As a result, it is possible to increase the proportion of light rays that contribute to the formation of the image M, with respect to the projection light incident on the screen 5. Further, with the half-value angle of the specular-reflective screen set to 20° or more, it is possible to make the amount of projection light incident on the optical plate 2 substantially the same anywhere across an incidence area of the optical plate 2. As a result, it is possible to reduce occurrence of image defects due to different light amounts at different incidence positions (uneven light amount), such as unevenness in color and brightness of the image M. Specifically, it is possible to reduce occurrence of uneven brightness that makes the image M bright at its center (design center) but dark at its periphery.

As shown in FIG. 1, it is desirable that a sum of angles of incidence and reflection of the central light ray L1 of the light beam of the projection light with respect to the screen 5 (angle $\alpha$) be 15-35°. The angle $\alpha$ in this range surely makes it possible to perform optical path separation and form the image M in the air that is bright and less in distortion. Incidentally, if the angle $\alpha$ is less than 15°, the angle of incidence of the projection light on the screen 5 becomes so close to 90° that it becomes difficult to separate the projection light reflected by the screen 5 from the optical path of the incident light and direct the reflected projection light to the optical plate 2. If the angle $\alpha$ is larger than 35°, the projection light reflected by the screen 5 is emitted therefrom in an oblique direction, and this makes it more likely that the use efficiency of the projection light (proportion of light rays contributing to the formation of the image M) will deteriorate, and further, makes it more likely that distortion will occur in the image M formed in the air via the counter mirror 4a and the optical plate 2.

The projection surface of the screen 5 may be any of the flat surface 11, the curved surface 12, or the uneven surface 13, and in a case where it is the flat surface 11, it is possible, with the simplest configuration, to form the image M as a flat image with the screen 5. On the other hand, in a case where the projection surface of the screen 5 is the uneven surface 13, it is possible to give the image M formed in the air recesses and projections or steps to thereby make the image M appear to be more stereoscopic, or make the image M appear more to be floating in the air, to the viewer. As described above, the uneven surface 13 can be securely formed by continuously connecting recessed parts 14 and projecting parts 15 or by forming discontinuous steps with a plurality of surfaces 16, 17.

In the case where the projection surface of the screen 5 is made of the flat surface 11 and the image M is formed in the air as a flat image, it is desirable that an angle $\beta$ which is formed as shown in FIG. 1 by a normal line P of the optical plate 2 and a normal line Q of the image formation plane of the image M be 15-60°. Here, the normal lines P, Q are normal lines at points at which the optical path of the central light ray L1 crosses the optical plate 2 and the image formation plane. In this case, there is no severe limitation imposed on the viewing direction, and it is possible to allow the viewer to view the image M having a predetermined dimensions.

Figure 4:
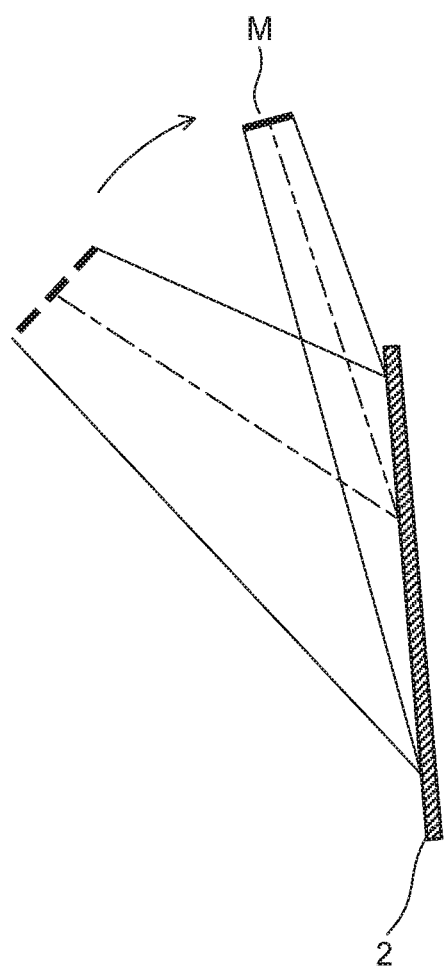
FIG. 4 is an explanatory diagram showing an image formation position as a reference example.

Incidentally, if the angle $\beta$ is less than 15°, the image formation plane of the image M is close to parallel to the optical plate 2, and also close to directly above a light exit surface of the optical plate 2. Hence, to be in conformity with such a position of the image formation plane of the image M, the screen 5 needs to be positioned in plane symmetry to the image M with respect to the optical plate 2. In this case, the image M cannot be viewed from a direction of the normal line of the optical plate 2 (because there are cases where the projection light from the screen 5 passes through the optical plate 2 without being reflected inside the optical plate 2), there is a possibility that the image M is viewable only from limited directions. Furthermore, with the configuration where the optical path of the projection light is folded via the counter mirror 4a, there also is a possibility of interference between the screen 5 and the optical plate 2. On the other hand, if the angle β is more than 60°, as shown in a reference example illustrated in FIG. 4, a beam width of the projection light emitted from the optical plate 2 is reduced, and accordingly the image M is formed in a small area.

(Another Configuration of Aerial Image Display Device)

Figure 5:
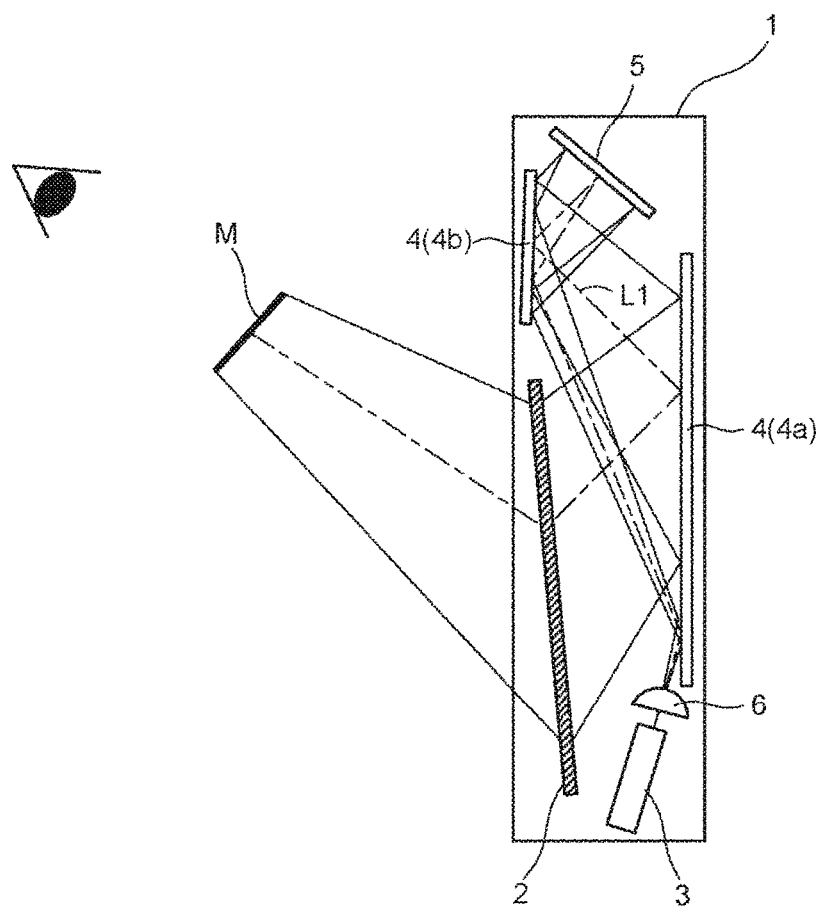
FIG. 5 is an explanatory diagram schematically showing another configuration of the aerial image display device.

FIG. 5 is an explanatory diagram schematically showing another configuration of the aerial image display device 1. As shown in the figure, the mirror 4 of the aerial image display device 1 may further include an optical path folding mirror 4b in addition to the counter mirror 4a. The optical path folding mirror 4b is a mirror that reflects incident light to fold the optical path, and is disposed on the optical plate 2 side with respect to the screen 5.

Further, in FIG. 5, for the purpose of projecting an image of appropriate dimensions onto the screen 5, a plano-convex lens 6 is disposed in the optical path between the projection device 3 and the counter mirror 4a to make the projection light converge on the screen 5. Here, the disposition of the plano-convex lens 6 may be omitted depending on specifications of the projection device 3 used and positional relationship between the projection device 3 and the screen 5.

In this configuration, the projection light emitted from the projection device 3 passes through the plano-convex lens 6, and is then sequentially reflected by the counter mirror 4a and the optical path folding mirror 4b to be incident on the screen 5, and after being reflected by the screen 5, the projection light is sequentially reflected by the same optical path folding mirror 4b and the same counter mirror 4a to be incident on the optical plate 2. Thereafter, the projection light is directed in the same manner as in the configuration shown in FIG. 1, and the image M is formed in the air by means of the optical plate 2.

With the configuration shown in FIG. 5, the image M (two-dimensional image) formed in the air has dimensions of 120 mm (H)×190 mm (W). Here, the parameters of the device at this time is as follows:

The effective area of the optical plate 2 (area in which incident light is reflected to the image formation side of an image) is 350 mm×350 mm.

The distance from the optical plate 2 to the image M on the optical path of the central light ray L1 of the light beam of the projection light is 300 mm.

The distance from the center of the image M to the eye point of the viewer is 500 mm.

The projection device is 400-PRJ014BK produced by SANWA SUPPLY INC.

The plano-convex lens is 40 mm in diameter and 400 mm in focal length.

Note that this configuration is similar to the configuration shown in FIG. 1 in that the orthogonally disposed reflective surfaces of the optical plate 2 form angles of ±45° with respect to the vertical direction.

Thus, by adopting the mirror 4 composed of a plurality of mirrors (the counter mirror 4a, the optical path folding mirror 4b) to fold the optical path of the projection light, the device can be made thinner without reducing the size of the screen 5 (without reducing the size of the image M formed in the air). Further, although not shown, the mirror 4 may be composed of three or more mirrors, with which it is possible to make the device even thinner by folding the optical path as in the above description.

(Details of Optical Plate)

Figure 6:
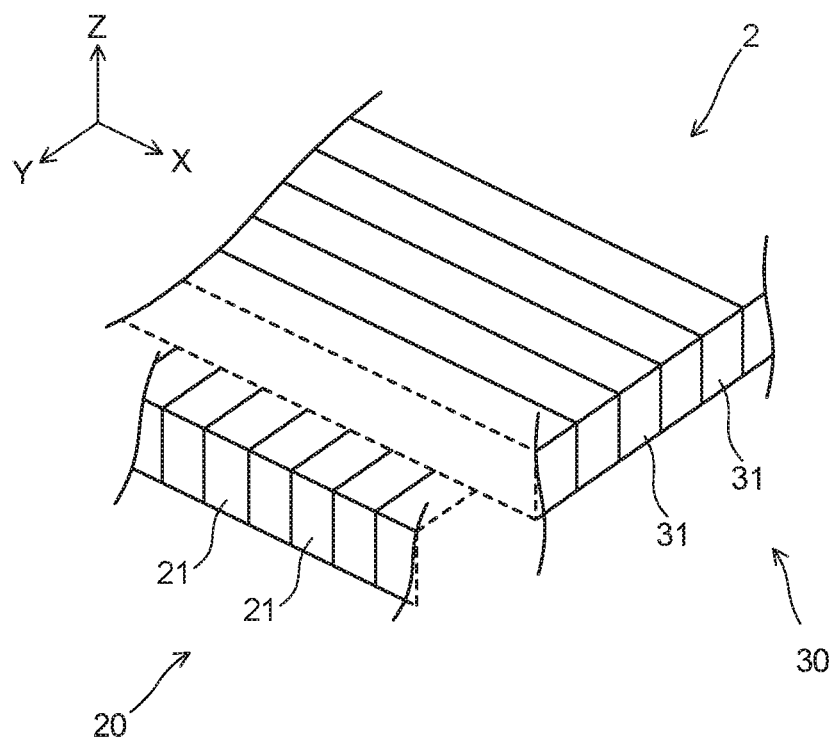
FIG. 6 is a perspective view showing a schematic configuration of an optical plate of the aerial image display device.

Next, a description will be given of details of the optical plate 2, which has been mentioned above. FIG. 6 is a perspective view showing a schematic configuration of the optical plate 2. The optical plate 2 is composed of two kinds of substrates 20, 30, which are put one over the other. The substrate 20 is formed of a plurality of plate members 21 aligned, in a plane perpendicular to a direction in which the substrates 20, 30 are put one over the other (for example, Z direction), to be adjacent to each other in one direction (for example, X direction) of two directions perpendicular to each other, and the substrate 30 is formed of a plurality of plate members 31 aligned to be adjacent to each other in the other direction (for example, Y direction) of the two directions perpendicular to each other.

Figure 7:
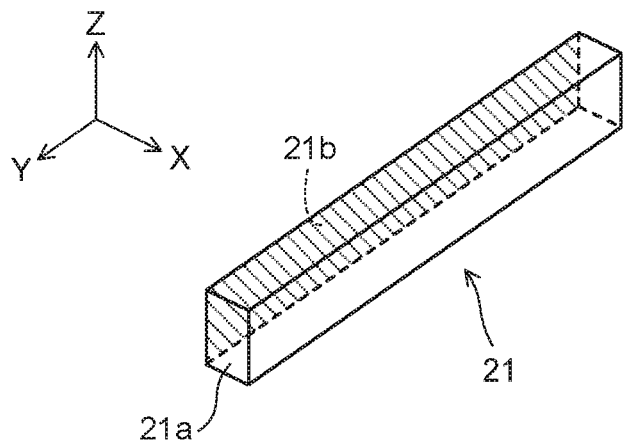
FIG. 7 is a perspective view of a plate member constituting the optical plate.
Figure 8:
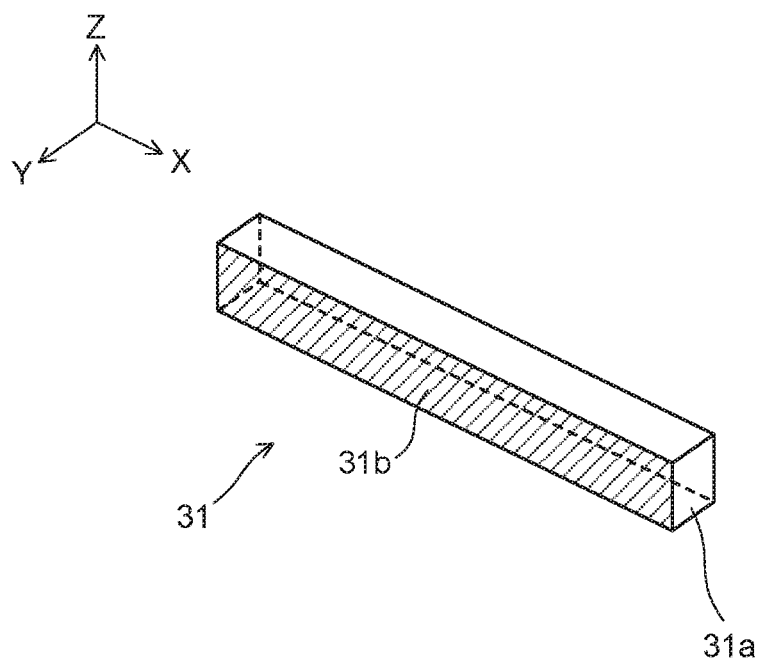
FIG. 8 is a perspective view of another plate member constituting the optical plate.

FIG. 7 is a perspective view of one of the plate members 21, and FIG. 8 is a perspective view of one of the plate members 31. The plate members 21 are made of a transparent resin (for example, an acrylic resin), and in each of them, a reflective film 21b is formed by vapor deposition on a side surface of a body 21a which has a cuboid shape elongated in the Y direction, that is, one of two surfaces along a YZ plane. The plate members 31 are made of a transparent resin (for example, an acrylic resin), and in each of them, a reflective film 31b is formed by vapor deposition on a side surface of a body 31a which has a cuboid shape elongated in the X direction, that is, one of two surfaces along a ZX plane. The reflective films 21b, 31b are formed as a film of metal such as aluminum, and their film thicknesses are appropriately controlled to reflect entire light incident thereon.

By aligning the plurality of plate members 21 elongated in the Y direction to be adjacent to each other in the X direction, a plurality of reflective films 21b are aligned side by side in the X direction at intervals equivalent to a width of each of the plate members 21 in the X direction. Likewise, by aligning the plurality of plate members 31 elongated in the X direction to be adjacent to each other in the Y direction, a plurality of reflective films 31b are aligned side by side in the Y direction at intervals equivalent to a width of each of the plate members 31 in the Y direction. As a result of this arrangement of the plurality of plate members 21, 31, the reflective film 21b (reflective surface) of each of the plate members 21 and the reflective film 31b (reflective surface) of each of the plate members 31 have a positional relationship such that they are orthogonal to each other in plan view (as viewed from a Z axis direction).

Figure 9:
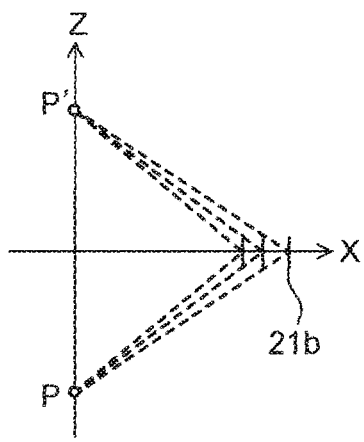
FIG. 9 is an explanatory diagram showing a theory of how a real image is formed in two dimensions.

FIG. 9 shows the theory of how a real image is formed in two dimensions (in the ZX plane). A plurality of light rays emitted from a point light source P are reflected by the reflective surfaces (reflective films 21b) which are parallel to the Z axis, and converge at a position P' on a side opposite to the point light source P with respect to the X axis (a position symmetric to the point light source P with respect to the X axis). Thereby, a real image of the point light source P is formed at the position P'.

Figure 10:
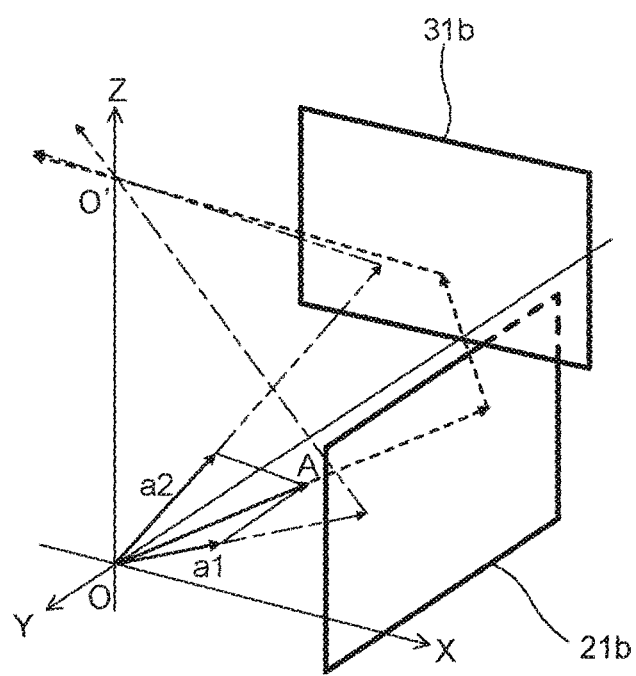
FIG. 10 is an explanatory diagram schematically showing reflection of light rays in the three-dimensional space.

FIG. 10 schematically shows reflection of light rays in a three-dimensional space (XYZ coordinate system). In the three-dimensional space, a point of intersection of light A with the Z axis can be obtained by dividing the light A emitted from a point light source O into a light ray a1 in the ZX plane and a light ray a2 in the YZ plane, and, by considering reflection of the light rays a1, a2 in the ZX plane or the YZ plane, as in FIG. 9. That is, the light ray a1 in the ZX plane is reflected by a reflective surface (reflective film 21b) parallel to the YZ plane and then travels toward the Z axis, while the light ray a2 in the YZ plane is reflected by a reflective surface (reflective film 31b) parallel to the ZX plane and then travels to the Z axis. These light rays a1, a2 cross each other at one point on the Z axis, that is, a point O'. Thus, the light A travels toward the point O' on the Z axis after being reflected twice, once by the reflective film 21b and once by the reflective film 31b.

Figure 11:
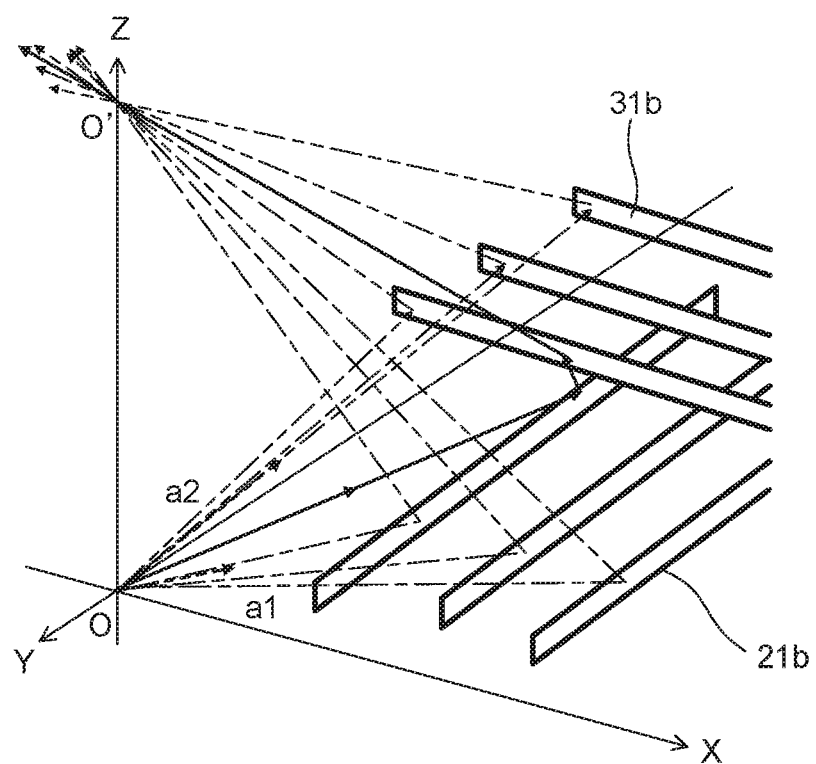
FIG. 11 is an explanatory diagram schematically showing how a plurality of light rays converge to one point via different reflective surfaces in the three-dimensional space.

FIG. 11 schematically shows how a plurality of light rays emitted from the point light source O converge to one point via different reflective surfaces in the three-dimensional space. The plurality of light rays emitted from the point light source O are, like in FIG. 10, reflected by reflective surfaces (reflective films 21b) parallel to the YZ plane and reflective surfaces (reflective films 31b) parallel to the ZX plane, and converge at the same point O' on the Z axis. Thereby, a real image of the point light source O is formed at the point O'.

Note that, although displacement is caused in the convergence state, for example, due to difference between incidence positions of the light rays in the height direction (Z-axis direction) of the reflective surfaces and depending on accuracy of arrangement of the reflective surfaces, this displacement is so slight that it can be ignored in viewing the real image. Note also that, although some light rays travel along complicated paths by being reflected by the reflective surfaces three or more times in total, such light rays can also be ignored.

In the present embodiment, the optical plate 2 is configured to have two kinds of reflective surfaces (reflective films 21b, reflective films 31b) displaced from each other in the Z-axis direction by putting two kinds of substrates 20, 30 one over the other, but a plate where reflective films 21b, 31b are disposed on one same substrate may be used as the optical plate 2. That is, the optical plate 2 may be configured such that two reflective surfaces are formed on a plate such that one is orthogonal to the other and that a plane including normal lines of one and the other reflective surfaces is orthogonal to a direction of thickness of the plate.

(Other)

The aerial image display device of the present embodiment may also be described as follows.

According to the present embodiment, an aerial image display device includes an optical plate having a plurality of reflective surfaces orthogonal to each other in plan view, and, by directing light to be incident on the optical plate and having the light reflected by the plurality of reflective surfaces to collect the light in air on a side which is opposite to a light-incident side with respect to the optical plate, forms an image in the air, the aerial image display device further comprising a projection device which emits projection light representing the image, a screen which is irradiated with the projection light, and a mirror which reflects incident light. Here, the mirror includes a counter mirror disposed on a side opposite to an image-forming side where the image is formed, with respect to the optical plate, with a space between the counter mirror and the optical plate, the projection device and the screen is disposed on the side opposite to the image forming side with respect to the optical plate so as to sandwich there between the optical path between the opposing mirror and the optical plate, and the projection light emitted from the projection device is incident on the screen after being reflected by the counter mirror, and is then incident on the optical plate after being reflected by the screen and then by the same counter mirror.

It is desirable that the counter mirror be disposed such that the space between the counter mirror and the optical plate is wider on the screen side than on the projection-device side.

The mirror may further include an optical path folding mirror which is disposed on the same side as the optical plate with respect to the screen, and folds the optical path of incident light, such that the projection light emitted from the projection device is incident on the screen after being sequentially reflected by the counter mirror and by the optical path folding mirror, and is then incident on the optical plate after being reflected by the screen and then being sequentially reflected by the same optical path folding mirror and by the same counter mirror.

The screen is desirably a specular-reflective screen having a half-value angle of 20-40°, the half value angle representing an angle at which a gain of the screen is half a peak gain.

A sum of angles of incidence and reflection of the central light ray of the light beam of the projection light with respect to the screen is desirably 15-35°.

In the screen, the surface irradiated with the projection light may be a flat surface.

An angle formed by a normal line of the optical plate and a normal line of an image formation plane where the image is formed is desirably 15-60°.

In the screen, the surface irradiated with the projection light may be an uneven surface having recesses and projections formed thereon.

The uneven surface may include a recessed part and a projecting part such that the recessed part and the projecting part are continuously connected with each other. That is, the uneven surface may be formed by the recessed part and the projecting part being continuously connected with each other.

The uneven surface may include a plurality of surfaces such that the plurality of surfaces are disposed separate from each other by being displaced from each other in a direction perpendicular thereto from a state of being aligned on a same plane. That is, the uneven surface may be formed of a plurality of steps formed by displacing, relative to each other, a plurality of surfaces aligned side by side on the same plane, in a direction perpendicular to the surfaces.

Although embodiments of the present invention have been described and illustrated in detail, it is clearly understood that the same is by way of illustration and example only and not limitation, the scope of the present invention should be interpreted by terms of the appended claims.

INDUSTRIAL APPLICABILITY

The present invention is usable in an aerial image display device which forms an image in the air by using an optical plate.

LIST OF REFERENCE SIGNS 1 aerial image display device
2 optical plate
3 projection device
4 mirror
4a counter mirror (mirror)
4b optical path folding mirror (mirror)
5 screen
11 flat surface
13 uneven surface
14 recessed part
15 projecting part
16 surface
17 surface
21b reflective film (reflective surface)
31b reflective film (reflective surface)
M image

The invention claimed is:

1. An aerial image display device which comprises an optical plate having a plurality of reflective surfaces orthogonal to each other in plan view, and which, by directing light to be incident on the optical plate and having the light reflected by the plurality of reflective surfaces to collect the light in air on a side which is opposite to a light-incident side with respect to the optical plate, forms a real image in the air, the aerial image display device further comprising:
- a projection device which emits projection light representing an image;
- a screen which is irradiated with the projection light; and
- a mirror which reflects incident light, wherein the mirror includes a counter mirror disposed on a side opposite to an image-forming side where the real image is formed, with respect to the optical plate, with a space between the counter mirror and the optical plate, the projection device and the screen are disposed on the side opposite to the image-forming side with respect to the optical plate so as to sandwich there between an optical path between the counter mirror and the optical plate, the projection light emitted from the projection device is incident on the screen after being reflected by the counter mirror, and is then incident on the optical plate after being reflected by the screen and then by the same counter mirror, and the optical plate forms the real image of the image projected on the screen.

2. The aerial image display device according to claim 1, wherein the counter mirror is disposed such that the space between the counter mirror and the optical plate is wider on a screen side than on a projection-device side.

3. The aerial image display device according to claim 1, wherein the mirror further includes an optical path folding mirror which is disposed on a same side as the optical plate with respect to the screen, and folds an optical path of incident light, and the projection light emitted from the projection device is incident on the screen after being sequentially reflected by the counter mirror and by the optical path folding mirror, and is then incident on the optical plate after being reflected by the screen and then being sequentially reflected by the same optical path folding mirror and by the same counter mirror.

4. The aerial image display device according to claim 1, wherein the screen is a specular-reflective screen, and a half-value angle of the screen is 20-40°, the half-value angle being an angle at which a gain of the screen is half a peak gain of the screen.

5. The aerial image display device according to claim 1, wherein a sum of angles of incidence and reflection of a central light ray of a light beam of the projection light with respect to the screen is 15-35°.

6. The aerial image display device according to claim 1, wherein, in the screen, a surface irradiated with the projection light is a flat surface.

7. The aerial image display device according to claim 6, wherein an angle formed by a normal line of the optical plate and a normal line of an image formation plane where the image is formed is 15-60°.

8. The aerial image display device according to claim 1, wherein, in the screen, a surface irradiated with the projection light is an uneven surface having recesses and projections formed thereon.

9. The aerial image display device according to claim 8, wherein the uneven surface includes a recessed part and a projecting part, and the recessed part and the projecting part are continuously connected with each other.

10. The aerial image display device according to claim 8, wherein the uneven surface includes a plurality of surfaces, and the plurality of surfaces are disposed separate from each other by being displaced relative to each other in a direction perpendicular thereto from a state of being aligned side by side on a same plane.

* * * * *